Figure 1:
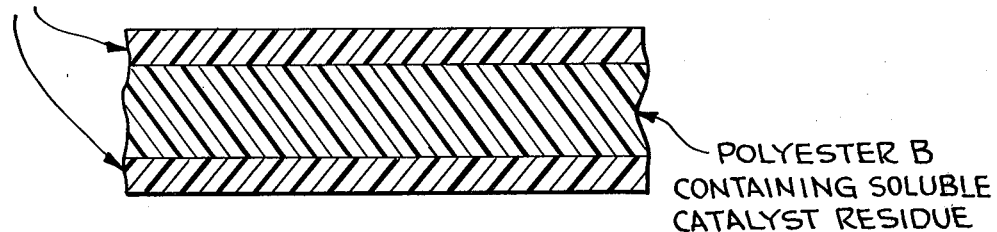

United States Patent [19]
Riboulet et al.

[11] 3,900,653

[45] Aug. 19, 1975

[54] COMPOSITE POLYESTER FILMS AND PROCESS FOR PRODUCING THE SAME

[75] Inventors: Robert Riboulet, Crepieux; Eugene Charvet, Saint-Maurice-de Beynost, both of France

[73] Assignee: La Cellophane, Paris, France

[22] Filed: Feb. 13, 1973

[21] Appl. No.: 332,183

[30] Foreign Application Priority Data
Feb. 16, 1972   France .................................. 72.05115

[52] U.S. Cl. ................ 428/212; 264/172; 428/409; 428/480; 428/539; 428/910; 428/918
[51] Int. Cl... B32b 33/00; B32b 27/18; B32b 27/36
[58] Field of Search ............ 264/171, 172; 161/164, 161/166, 182, 408–411, 214, 225, 231

[56] References Cited
UNITED STATES PATENTS

| | | | |
|---|---|---|---|
| 3,322,614 | 5/1967 | Seiferth et al. ................ | 161/411 X |
| 3,423,281 | 1/1969 | Wiener ........................... | 161/214 X |
| 3,515,626 | 6/1970 | Duffield .......................... | 161/162 |
| 3,574,048 | 4/1971 | Klimisch ......................... | 161/214 X |
| 3,627,625 | 12/1971 | Jarrett............................. | 161/411 X |
| 3,790,653 | 2/1974 | Barkey et al.................... | 264/171 |
| 3,836,620 | 9/1974 | Bhuta et al. .................... | 264/171 |

*Primary Examiner*—Harold Ansher
*Attorney, Agent, or Firm*—Sherman & Shalloway

[57] ABSTRACT

A monoaxially or biaxially drawn composite polyester film comprising at least two layers of polyesters having different physical properties, at least one of these layers being produced utilizing a catalytic system wherein the catalyst residue is insoluble in the polymer and at least one other polyester being produced using a catalyst system wherein the catalytic residue is soluble or only slightly insoluble in the polyester. The process for producing such composite polyester films comprises coextruding at least two polyester polymers into a layered film, one of these polyester layers containing crystallization sites in the form of the residue of the interchange catalyst used to form the polyester, and at least one polyester layer comprises one wherein the interchange catalyst system is soluble or only slightly insoluble in the polyester film; and drawing the layered films either monoaxially or biaxially.

9 Claims, 2 Drawing Figures

POLYESTER A CONTAINING INSOLUBLE CATALYST RESIDUE

POLYESTER B CONTAINING SOLUBLE CATALYST RESIDUE

POLYESTER A

POLYESTER B

COMPOSITE POLYESTER FILMS AND PROCESS FOR PRODUCING THE SAME

This invention relates to improved drawn polyester films and processes for making the same. More particularly, this invention relates to monoaxially and biaxially drawn polyester films which are sufficiently transparent and have sufficient slip properties so that these films may be utilized and processed properly on high speed processing machines.

Polyester films and especially polyethylene terephthalate films are often utilized for a great number of purposes since these films have excellent physical properties. Often, however, the physical properties which are desired for a particular application result in other properties of the polyester films which are sometimes contradictory to the property most desired. For example, the transparency and slipperiness of polyester films are all interrelated with surface roughness. While it is often desirable to produce polyester films with good slip properties so that the polyester films have the desired processibility, these films also have an opacity caused by the same surface roughness which produces the excellent slip properties. Accordingly, these films are unacceptable for a number of uses wherein both high transparency and good slip properties are desired.

Most polyester films for various end uses are now prepared as a single layer polyester film with various coatings added thereto so as to modify the surface properties of the polyester films, such as in U.S. Pat. Nos. 3,595,736, 3,627,625, 3,645,822 and 3,632,666. The co-extrusion of a series of polyesters wherein at least one of the co-extruded layers has a polyester modifying additive contained therein has been suggested by U.S. Pat. No. 3,515,626. The process as disclosed in this patent, however, has not been completely successful in removing all of the problems regarding the contradictory properties of polyester films. In this regard, although incorporating a specific amount of crystallinity promoting material, i.e., crystallizing sites, into the polyester before extrusion promotes the crystallinity of the polyester in one layer, while not promoting the crystallinity of the polyester in the other layers on drawing, the incorporation of a proper amount of these crystallization sites into the polyester is a very delicate operation requiring absolute precision so that the desired properties are produced. Furthermore, the utilization of these additives because they are added in addition to the catalysts and other materials during the polycondensation of the polyesters, occasionally hinders the polycondensation reaction itself and thereby degrades the physical characteristics of the polyester films produced thereby. This is especially true with regard to color and thermal stability of the polyester films.

Although it is desirable to produce polyester films which have excellent surface slip so that they can be wound at high speeds and processed properly without interference caused by static buildup, previously this surface slip could only be obtained with a concomitant reduction in transparency. Transparent polyester films are especially desirable when the end product monoaxially or biaxially drawn polyester film is to be utilized in the graphic arts or as a textile material. Furthermore, the reduction in surface smoothness is also necessary when the polyester film is to be utilized as a metallized film base for use in gold tooling or in a manufacture of magnetic tapes.

Although polyester films can be produced having acceptable slip and transparency properties, when these films are oriented either monoaxially or biaxially, the slip properties are improved while the transparency is decreased. This is caused by an increase in the surface roughness of the films produced by the orientation.

Often, however, for many uses it is not necessary that the surface characteristics of the polyester films be identical on both sides of the films and that the finished product may sometimes even be improved when the polyester films have asymmetrical surface characteristics, i.e., a film having different surface characteristics on each of its two surfaces.

It is within the above environment and background that the process and product of the present invention were developed. Briefly, the polyester film laminate of the present invention comprises a laminate having at least two layers, one of these layers comprising a polyester film which has been produced by a polycondensation reaction in the presence of a catalytic system which is insoluble in the polyester, and at least one layer comprising a polyester formed by a polycondensation reaction in the presence of a catalyst system which is soluble or only slightly insoluble in the polyester. The process of the present invention comprises co-extruding a polyester film having at least two layers, each of these layers being formed from a separate polyester, at least one of these polyesters being formed by the polycondensation in the presence of a catalyst system which is insoluble in the polyester and at least one layer being formed by the polycondensation in the presence of a catalyst which is soluble or only slightly insoluble in the polyester, and drawing the films either monoaxially or biaxially.

It is therefore the primary object of the present invention to provide a composite polyester film having improved transparency and slip characteristics.

It is a still further object of the present invention to provide a composite polyester film wherein at least one layer has excellent transparency characteristics and at least one layer has excellent slip characteristics.

It is a still further object of the present invention to provide a composite polyester film wherein the slip characteristics are imparted by means of the ester interchange catalyst residue.

It is a still further object of the present invention to provide a process for producing monoaxially and biaxially drawn polyester films having improved transparency and slip characteristics.

It is a still further object of the present invention to provide a process for producing composite polyester films wherein at least one layer has excellent transparency characteristics and at least one layer has excellent slip characteristics.

Still further objects and advantages of the composite polyester films of the present invention and processes for producing the same will become more apparent from the following more detailed description thereof.

Figure 2:
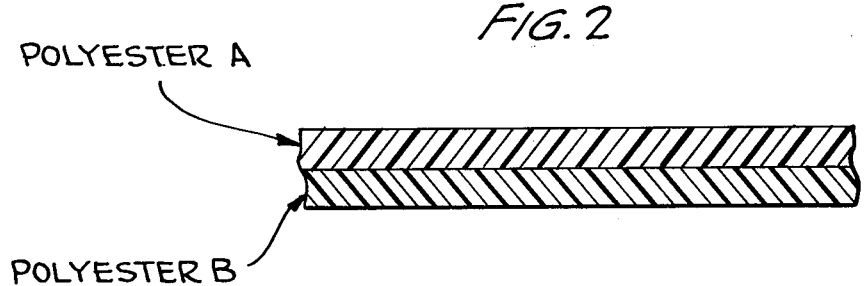

FIG. 1 is a cross sectional view of one embodiment of the present invention; and FIG. 2 is a cross sectional view of a second embodiment of the present invention.

The composite polyester laminate of the present invention comprises at least one polyester film layer formed from a polyester which includes a catalytic residue which is insoluble in the polyester and at least one layer formed from a polyester containing a catalyst residue which is soluble or only slightly insoluble, i.e., substantially soluble, in the polyester.

The process of the present invention comprises co-extruding at least two polyester layers, at least one of these layers comprising a polyester including a catalyst residue which is soluble or only slightly insoluble in the polyester and drawing this composite polyester film either monoaxially or biaxially.

The product of the present invention is formed from layers of polyester films which are co-extruded, these polyester films being formed by the polycondensation utilizing different catalytic systems. As noted above, these films are polyesters and include either polyesters or co-polyesters formed by the reaction of a dicarboxylic acid, particularly saturated dicarboxylic acids, e.g., terephthalic, and a glycol having from 2 to 6 carbon atoms, e.g., ethylene glycol. Of course, the preferred polyesters suitable for use as the films of the present invention are the polyethylene terephthalate films, although other polyesters such as the polyethylene adipate, polyethylene dimethyl terephthalate, etc., may be used.

The composite polyester films of the present invention are formed utilizing at least one polyester layer formed by the polycondensation of a dicarboxylic acid and a glycol in the presence of a catalyst or catalyst system which is insoluble in the polyester, or at least substantially insoluble in the melted polyester. Suitable substantially or totally insoluble interchange catalysts and catalyst systems for the melted polyesters include ester interchange systems based on calcium-antimony and lithium-antimony and include compounds such as calcium acetate, calcium benzoate, lithium antimonate, lithium acetate, etc. alone or mixed with potassium antimonate, antimony trioxide, antimony pentoxide, and antimony trichloride.

By utilizing these insoluble catalytic systems in forming the polyesters which are subsequently extruded into at least one layer of the composite films of the presesnt invention, the necessity of adding an additional nucleating agent to the polymer melt is obviated and by the control of the specific catalytic system utilized, the slip properties and transparency of the resulting film can be controlled.

The composite films of the present invention also include at least one layer formed from a polyester formed by the polycondensation in the presence of a catalyst having a catalytic residue which is soluble or only slightly insoluble, i.e., substantially soluble, in the polyester melt. Examples of catalytic systems which are suitable for use in forming the polyesters which do not contain a significant amount of nucleating agents, are zinc-antimony and manganese-antimony catalytic systems including manganese and zinc acetates, benzoates, carbonates, and borates alone or mixed with antimony trioxide, antimony pentoxide or antimony trichloride.

The catalytic systems themselves used to form the composite films of the present invention are conventional and form no portion of the present invention except to the degree the catalytic residue is soluble in the polyester melt. This degree of solubility can be determined easily by a person of skill in polyester chemistry.

The composite films of the present invention are formed by co-extruding at least one polyester film containing an insoluble or substantially insoluble catalytic residue and at least one polyester containing a soluble or substantially soluble catalytic residue, and subsequently orienting this composite polyester film either monoaxially or biaxially. Orientation of the polyester film improves the physical properties of these films; however, because this orientation causes crystallization within the polymers around the nucleating agents, the transparency and roughness or slip of the films are altered. For this reason, when it is desired to form a polyester composite film having good slip properties, while at the same time, maintaining adequate transparency, a thin layer of a polyester containing an insoluble catalytic residue may be extruded on each side of a layer of a polyester containing a soluble catalytic residue to produce a composite film as shown in FIG. 1. Subsequent to drawing, the two outer thin layers become somewhat opaque but will not materially reduce the transmission of light through the film. However, these films will be sufficiently thick so that the slip properties of the composite film will be improved.

It has been generally found that optimum slip and transmission properties are present when the polyester having excellent slip properties comprises from 5 to 25% by weight of the composite polyester and the polyester having excellent transmission comprises from 95 to 75% by weight of the composite polyester.

As noted above, polyester film having either good slip properties or good transparency have been well known and the compromise between these properties has often led to highly modified polymers. By utilizing the process and laminate of the present invention, however, a composite polyester film having a constant thickness may be produced having completely different surface characteristics and also having the desired amount of transparency or light transmission. Furthermore, it is possible in accordance with the process of the present invention to produce a composite polyester film wherein one side has excellent slip properties, while the other side does not have such slip properties such as the film shown in FIG. 2. These types of films are often needed in the textile and graphic arts industries since the films must be as transparent as possible, but also must be capable of being easily wound and used in a practical manner on processing machines. Accordingly, these films must only have the amount of slip required so that they may be properly processed while at the same time, maintaining their excellent transparency and light transmission.

The process of the present invention may be performed utilizing any conventional co-extrusion apparatus. A preferred apparatus for performing the co-extrusion of the process of the present invention is disclosed in copending application Ser. No. 318,778 entitled "Adjustable Flat Spinneret for the Coextrusion of Flat Films Comprising a Plurality of Components and Method for Using the Same" filed Dec. 27, 1972.

According to the process and composite film of the present invention, a polyester film having the desired properties with regard to light transparency and transmission and the desired slip properties may be produced merely by utilizing a different catalytic system for the co-polycondensation reaction.

The laminate and process of the present invention will be illustrated by the following examples and comparative examples which are for the purposes of illustration only and should not be construed as limiting.

EXAMPLES 1-3 AND COMPARATIVE EXAMPLES 1 AND 2

A polyethylene terephthalate polymer A is prepared by using calcium acetate as the interchange catalyst and a polymer B is prepared by using manganese acetate as the interchange catalyst.

These polymers are used to prepare films 12 microns thick by extrusion or co-extrusion. These films are then drawn biaxially at a rate of drawing of 2.5 in each direction. Comparative Examples 1 and 2 are films of polymer A and polymer B individually. In Examples 1 – 3, polymers A and B are coextruded in variable proportions as shown in Table 1 to obtain composite films with three layers A-B-A. The friction and transparency characteristics of these films measured under identical conditions are indicated in the following table:

| Example | % of Polymer A | % of Polymer B | Friction Factor | Haze |
|---|---|---|---|---|
| Comp No. 1 | 100 | 0 | 0.42 | 7 |
| 1 | 45 | 55 | 0.44 | 2.4 |
| 2 | 20 | 80 | 0.48 | 1 |
| 3 | 10 | 90 | 0.55 | 0.4 |
| Comp No. 2 | 0 | 100 | 2 | 0.2 |

As is apparent from Table I, films produced from Polymer A or Polymer B alone have excellent slip or transmission factors but not both. The films produced in accordance with the present invention have both acceptable slip and transmission characteristics without adding any separate agents to the composite films.

EXAMPLE 4 AND COMPARATIVE EXAMPLE 3

A polyester blend comprising 20% of said polymer A and 80% of said polymer B is prepared. This film has a haze of 1.2, a high transparency, but a friction factor of 0.60, poor slip.

A film (from 25% polymer A and 75% polymer B) produced using the procedure of Example 1 has a haze of 1.2 and reduces the friction factor from 0.60 to 0.47.

EXAMPLE 5

A composite film as shown in FIG. 2 is produced by co-extruding 10% of a polyethylene terephthalate produced using an ester interchange system of calcium acetate and antimony trioxide and 90% of a polyethylene terephthalate produced using a zinc acetate-antimony trioxide catalyst system. This film has good light transmission and has one side with excellent slip characteristics.

While the process and composite film of the present invention have been described by way of the foregoing specification and Examples, the same are for the illustration of the instant process and composite film and should be in no way construed as limiting the scope thereof, the process and composite laminate of the present invention being properly defined by way of the appended claims.

What is claimed is:

1. A composite monoaxially or biaxially oriented polyester laminate consisting essentially of (A) at least one polyester film layer formed from the polycondensation of a dicarboxylic acid and a glycol having from 2 to 6 carbon atoms in the presence of an ester interchange and polycondensation catalyst system, the residue of which is at least substantially insoluble in the polyester melt, and (B) at least one polyester film layer formed by the polycondensation of a dicarboxylic acid and a glycol having from 2 to 6 carbon atoms in the presence of an ester interchange and polycondensation catalyst system, the residue of which is at least substantially soluble in the polyester melt wherein said layer (A) containing the insoluble catalyst residue comprises from 5 to 25% by weight of the composite polyester laminate and wherein said layer (B) containing the soluble catalyst comprises from 95 to 75% by weight of the composite polyester laminate.

2. The laminate of claim 1, wherein at least one layer is formed by the polycondensation of ethylene glycol and terephthalic acid.

3. The laminate of claim 1, wherein the insoluble catalyst system is selected from conventional ester interchange catalyst systems consisting essentially of an antimony compound and a salt of calcium or lithium.

4. The laminate of claim 2, wherein the insoluble catalyst system is selected from conventional ester interchange catalyst systems consisting essentially of an antimony compound and a salt of calcium or lithium.

5. The laminate of claim 1, wherein the soluble catalyst system is selected from conventional ester interchange catalyst systems consisting essentially of an antimony compound and a salt of zinc or manganese.

6. The laminate of claim 2, wherein the soluble catalyst system is selected from conventional ester interchange catalyst systems consisting essentially of an antimony compound and a salt of manganese or zinc.

7. The laminate of claim 1, which comprises two layers of said polyester containing the insoluble catalyst residue and one layer containing a polyester having a soluble catalyst residue wherein the two layers containing the insoluble catalyst residue are on either side of the polyester layer containing the soluble catalyst residue wherein said layers of polyester containing the insoluble catalyst residue comprises from 5 to 25% by weight of the composite polyester laminate and the polyester layer containing the soluble catalyst residue comprises from 95 to 75% by weight of the composite polyester laminate.

8. The laminate of claim 1, wherein the insoluble catalyst system contains an ester-interchange catalyst selected from calcium acetate, calcium benzoate, lithium antimonate, or lithium acetate and a second catalyst selected from potassium antimonate, antimony trioxide, antimony pentoxide or antimony trichloride.

9. The laminate of claim 1, wherein the soluble catalyst system contains an ester-interchange catalyst selected from the acetates, borates, benzoates, or carbonates of manganese and zinc and a second catalyst selected from antimony trioxide, antimony pentoxide or antimony trichloride.

* * * * *